(12) United States Patent
Nelson

(10) Patent No.: US 8,020,811 B2
(45) Date of Patent: Sep. 20, 2011

(54) CABLE BRACKET AND STRAP ASSEMBLY

(75) Inventor: Kevin Larry Nelson, Cumming, GA (US)

(73) Assignee: Panduit Corp., Tinley Park, IL (US)

( * ) Notice: Subject to any disclaimer, the term of this patent is extended or adjusted under 35 U.S.C. 154(b) by 646 days.

(21) Appl. No.: 11/456,021

(22) Filed: Jul. 6, 2006

(65) Prior Publication Data

US 2007/0007397 A1    Jan. 11, 2007

Related U.S. Application Data

(60) Provisional application No. 60/697,221, filed on Jul. 7, 2005.

(51) Int. Cl.
*F16L 3/22* (2006.01)

(52) U.S. Cl. ............. 248/68.1; 248/55; 248/58; 248/63; 248/65; 248/74.1; 248/74.3; 24/16 PB; 174/68.1

(58) Field of Classification Search .......... 248/68.1, 248/49, 63, 65, 69, 73, 74.1, 74.3, 75, 79, 248/74.5, 55, 58, 317, 228.8, 230.8, 309.1; 24/16 PB, 483; 70/58, 18; 224/401; 174/71 R, 174/68.1

See application file for complete search history.

(56) References Cited

U.S. PATENT DOCUMENTS

| | | | |
|---|---|---|---|
| 1,856,109 A | 5/1932 | Murray | |
| 1,864,611 A | 6/1932 | Parker | |
| 3,476,868 A | 11/1969 | Williams et al. | |
| 3,966,154 A * | 6/1976 | Perrault et al. | 248/62 |
| 4,244,542 A | 1/1981 | Mathews | |
| 4,456,058 A | 6/1984 | Powell | |
| 4,458,385 A * | 7/1984 | Espinoza | 24/16 PB |
| 4,663,496 A | 5/1987 | Peek, Jr. | |
| 4,804,020 A | 2/1989 | Bartholomew | |
| 4,993,669 A | 2/1991 | Dyer | |
| 5,027,478 A * | 7/1991 | Suhr | 24/16 R |
| 5,090,645 A * | 2/1992 | Zuercher | 248/68.1 |
| 5,102,075 A | 4/1992 | Dyer | |
| 5,598,995 A | 2/1997 | Meuth et al. | |
| 5,742,982 A | 4/1998 | Dodd et al. | |
| 5,836,130 A | 11/1998 | Unruh et al. | |
| 5,918,490 A * | 7/1999 | Lion | 70/58 |
| 5,957,352 A * | 9/1999 | Gares | 224/401 |
| 6,353,186 B1 | 3/2002 | Dams et al. | |
| 6,497,414 B1 | 12/2002 | Roosen | |
| 6,552,270 B1 * | 4/2003 | Heacox | 174/71 R |
| 6,612,526 B2 | 9/2003 | Meuth et al. | |
| 6,710,249 B1 | 3/2004 | Denton | |
| 6,832,427 B2 | 12/2004 | Meuth et al. | |
| D541,142 S * | 4/2007 | Geiger | D8/383 |
| 7,500,644 B2 * | 3/2009 | Naudet et al. | 248/68.1 |
| 7,861,981 B2 * | 1/2011 | Olver | 248/68.1 |
| 2003/0173470 A1 * | 9/2003 | Geiger | 248/55 |
| 2005/0029004 A1 | 2/2005 | Robinson et al. | |
| 2007/0114339 A1 * | 5/2007 | Winchester | 248/68.1 |

* cited by examiner

*Primary Examiner* — Terrell Mckinnon
*Assistant Examiner* — Todd M. Epps
(74) *Attorney, Agent, or Firm* — Robert A. McCann; Christopher S. Clancy

(57) ABSTRACT

A cable bracket and strap assembly includes a cable bracket and a strap secured to the cable bracket. The cable bracket has a plurality of retention elements defining a plurality of conductor openings. The cable bracket also has a mounting flange, which includes a first aperture and a second aperture. The strap is secured to the cable bracket within the first aperture.

8 Claims, 11 Drawing Sheets

CABLE BRACKET AND STRAP ASSEMBLY

CROSS-REFERENCE TO RELATED APPLICATIONS

This application claims priority to U.S. Provisional Application No. 60/697,221, filed Jul. 7, 2005, the entirety of which is incorporated herein by reference.

BACKGROUND OF THE INVENTION

The present invention is directed to a cable bracket and strap assembly and, more particularly, a two-piece assembly comprising a cable bracket and a cable strap used to manage power conductors and signal wires in aerospace applications.

SUMMARY OF THE INVENTION

It would be desirable to provide a cable bracket and strap assembly that optimizes spacing of power conductors to prevent overheating and thermal breakdown of the conductor insulation.

It would also be desirable to provide a cable bracket and strap assembly that maintains uniform pressure around a wide range of power conductor diameters and therefore assists in preventing axial movement of the power conductors.

DETAILED DESCRIPTION OF PREFERRED EMBODIMENTS

Figure 13:
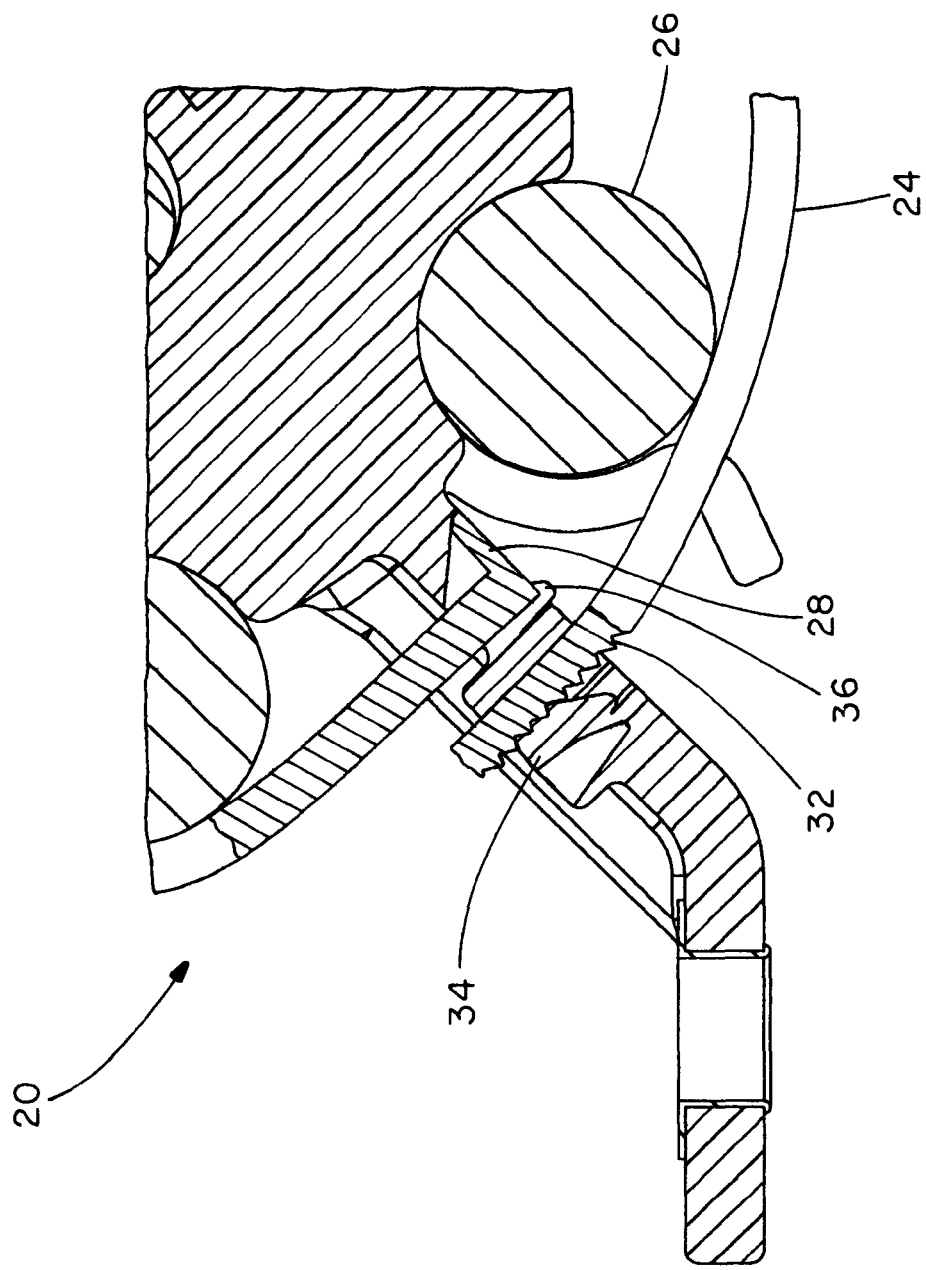
FIG. 13 is a cross-sectional view taken along lines 13-13 of FIG. 1.
Figure 14:
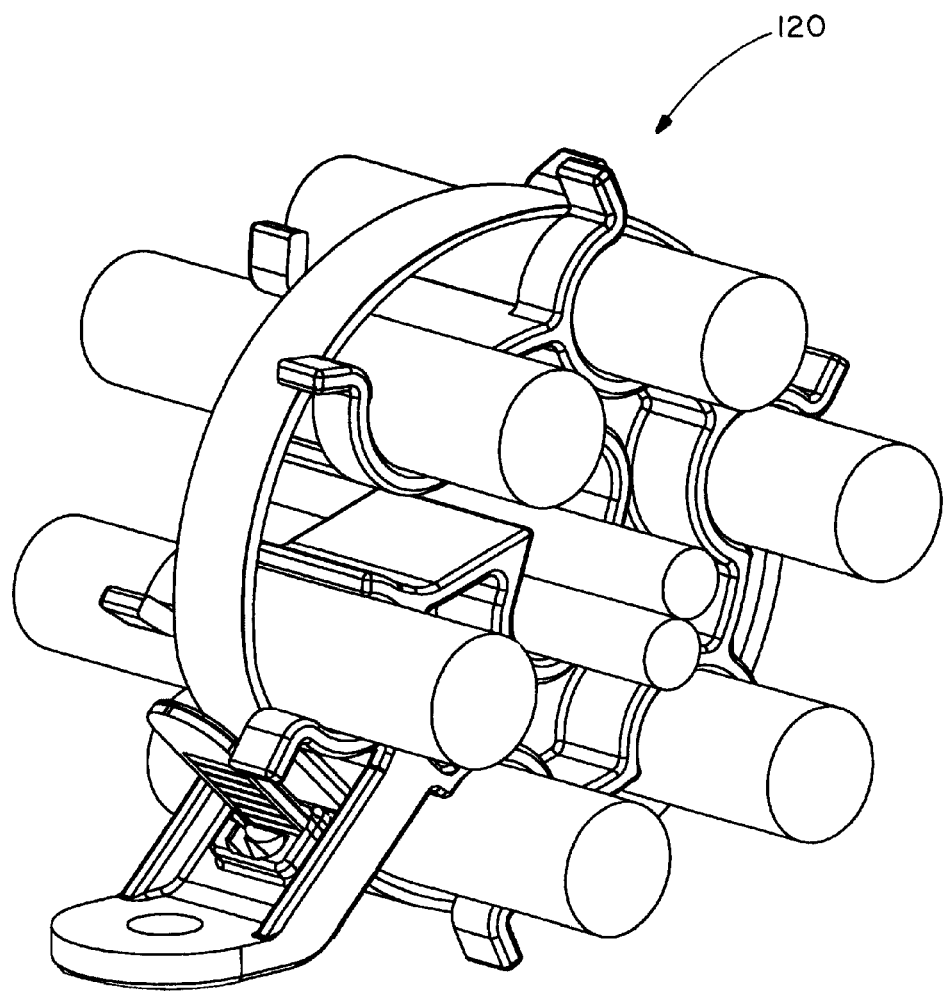
FIG. 14 is a front top perspective view of a cable bracket and strap assembly according to a second embodiment of the present invention.
Figure 15:
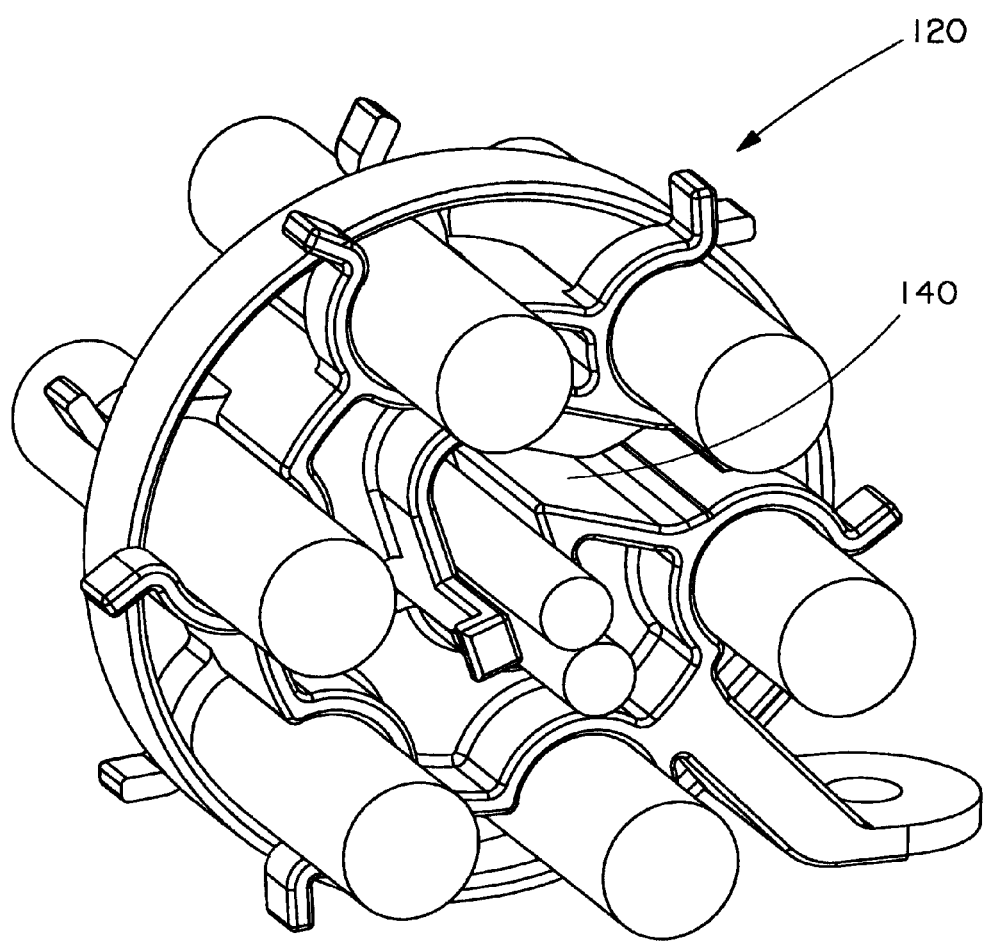
FIG. 15 is a rear top perspective view of the assembly of FIG. 14.
Figure 16:
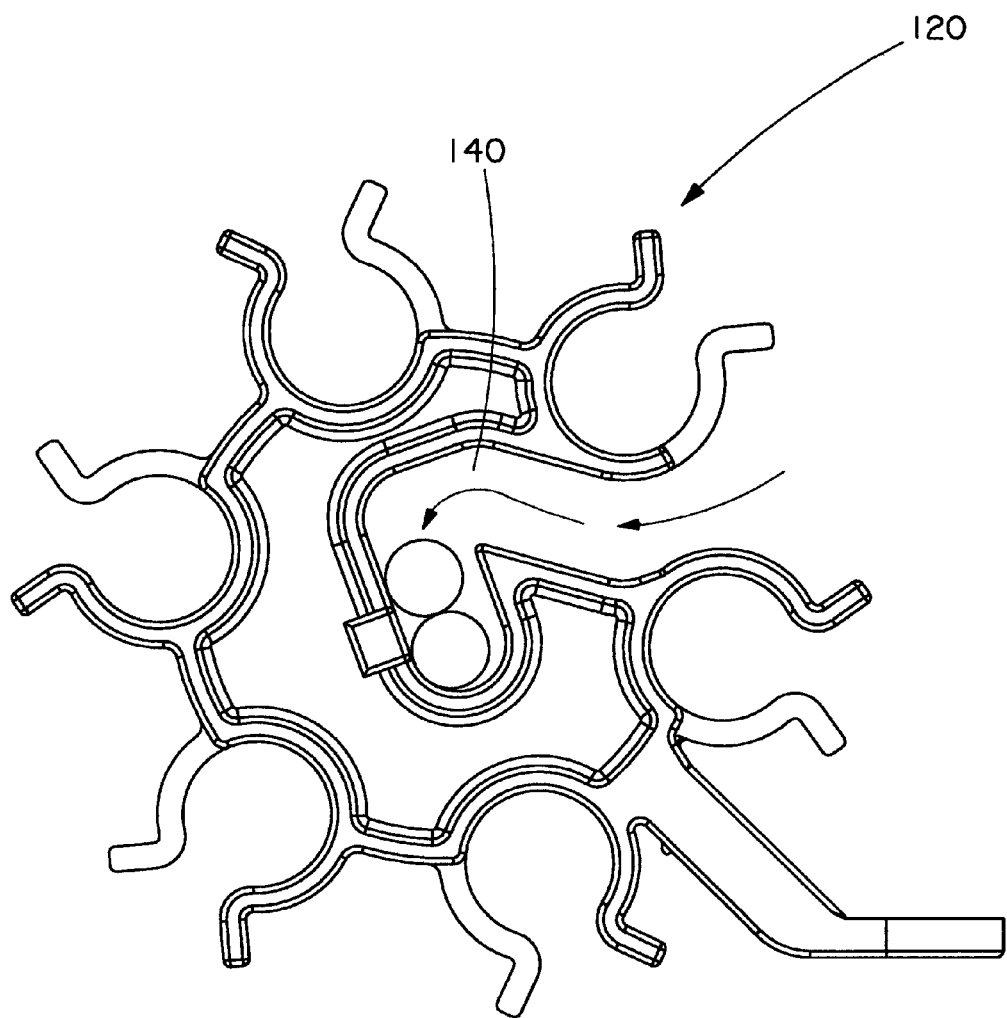
FIG. 16 is a rear top perspective view of the assembly of FIG. 14, with the power conductors and signal wires removed.

FIGS. 1-16 illustrate a cable bracket and strap assembly for managing power conductors and signal wires in aerospace applications, where spacing of the power conductors is critical to prevent overheating and thermal breakdown of the conductor insulation. Specifically, FIGS. 1-13 are directed to cable bracket and strap assembly 20, and FIGS. 14-16 are directed to cable bracket and strap assembly 120.

As shown in FIGS. 1-4, assembly 20 comprises cable bracket 22 and cable strap 24. Preferably, cable bracket 22 and cable strap 24 are made of a high temperature material to withstand the heat generated by power conductors 26. A soft high temperature material may be injection molded onto the interior of cable strap 24 in certain applications, such as high vibration environments.

Figure 4:
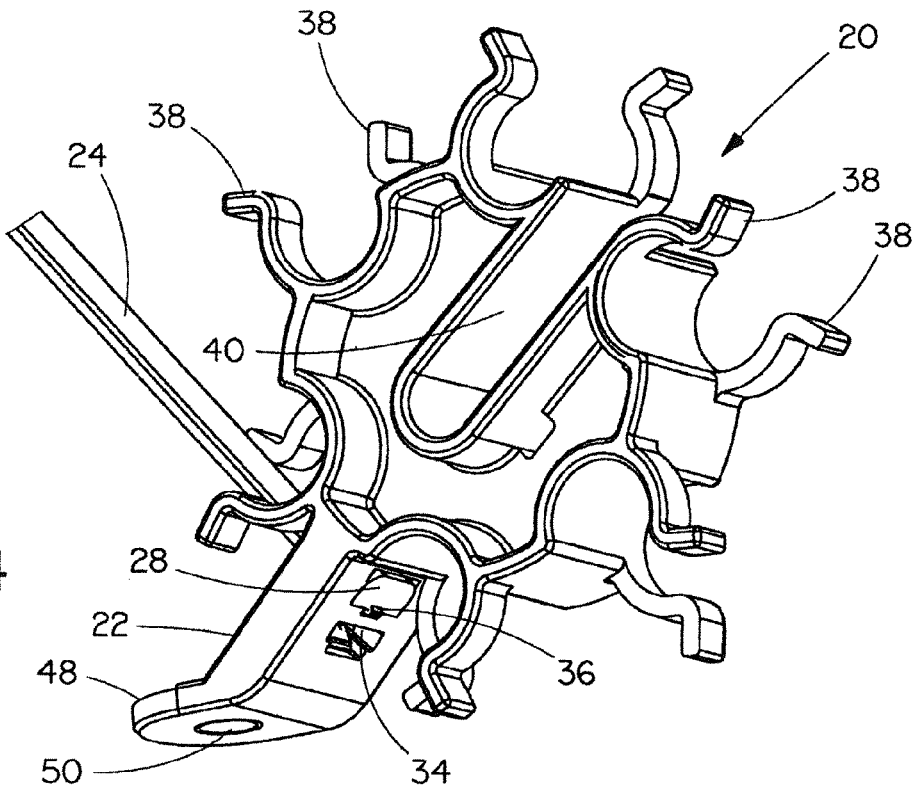
FIG. 4 is a front bottom perspective view of the assembly of FIG. 3.
Figure 5:
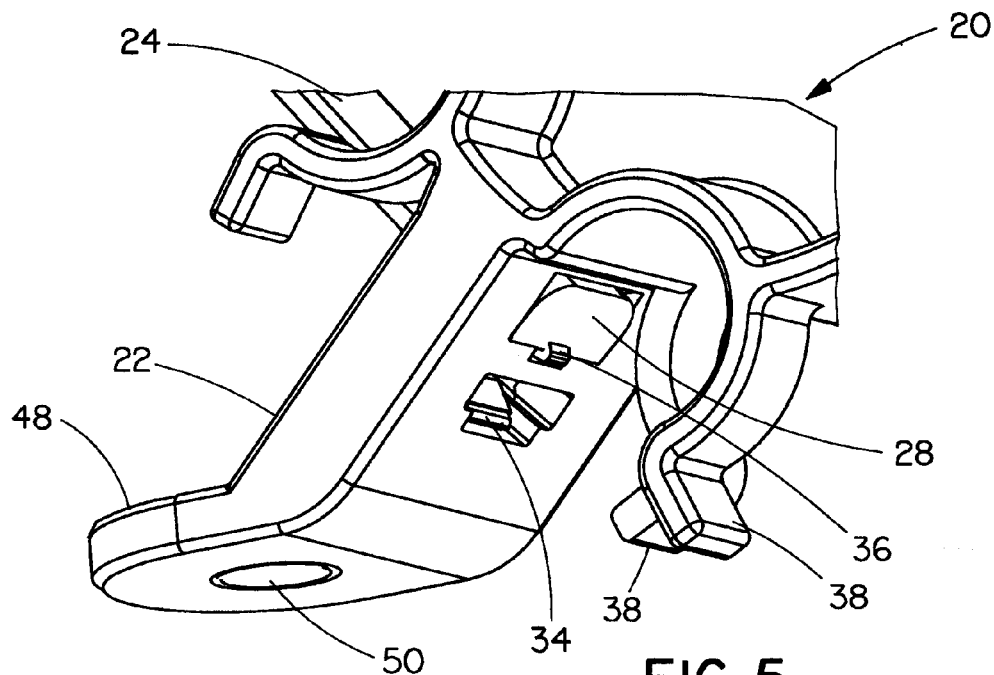
FIG. 5 is an enlarged front bottom perspective view of a portion of the assembly of FIG. 4.
Figure 6:
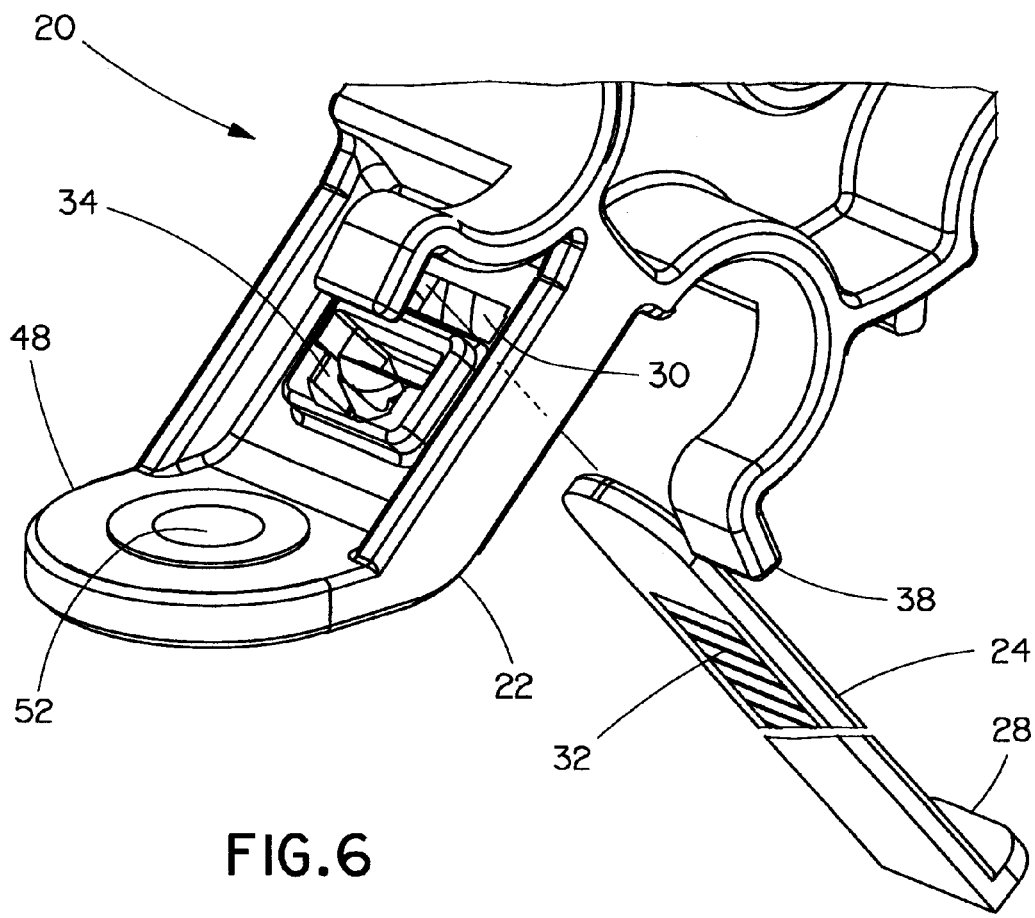
FIG. 6 is a partial exploded perspective view of the assembly of FIG. 1, with the cable strap removed.
Figure 7:
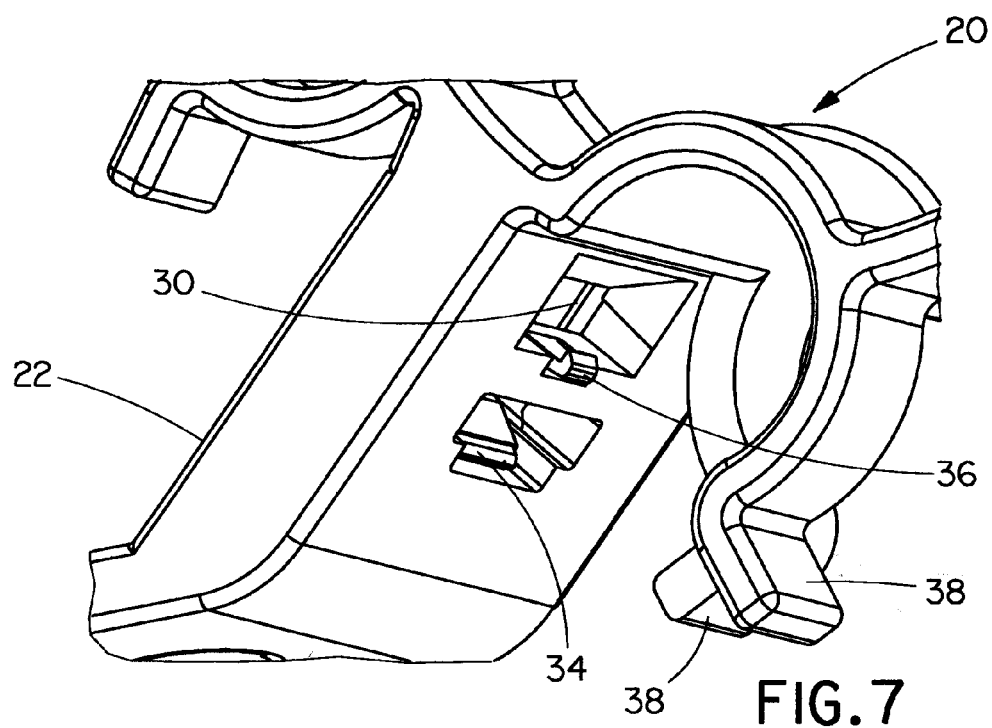
FIG. 7 is an enlarged front bottom perspective view similar to FIG. 5, with the cable strap removed.
Figure 8:
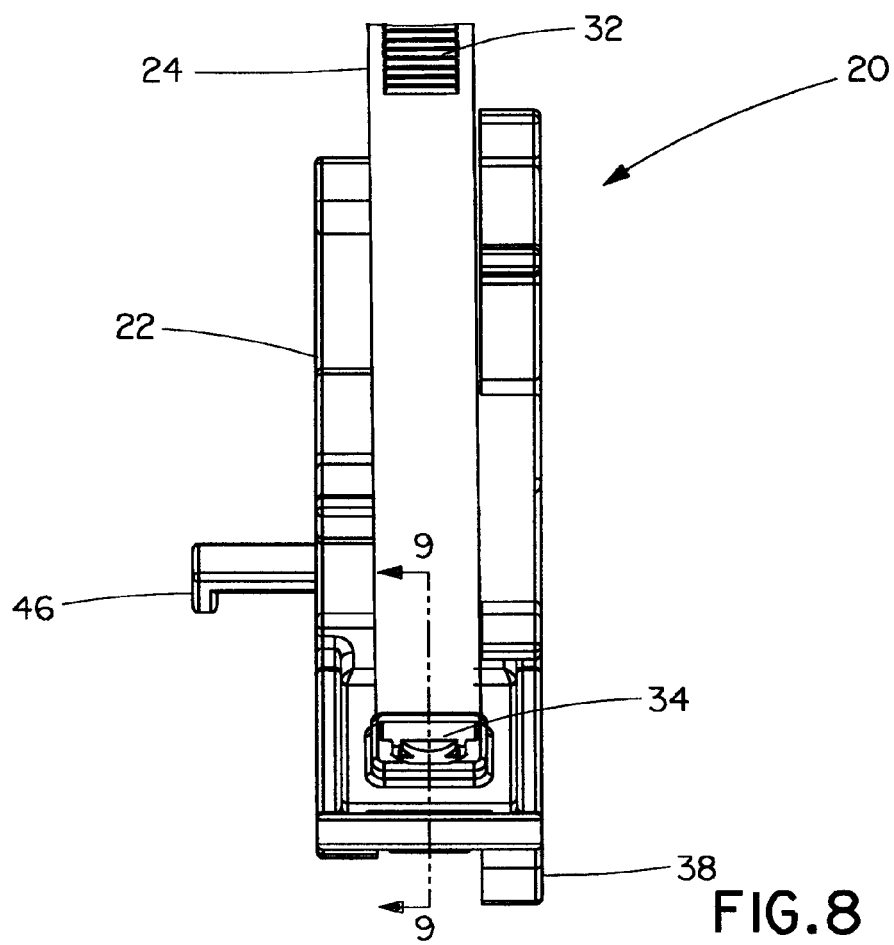
FIG. 8 is a side view of the assembly of FIG. 3.
Figure 9:
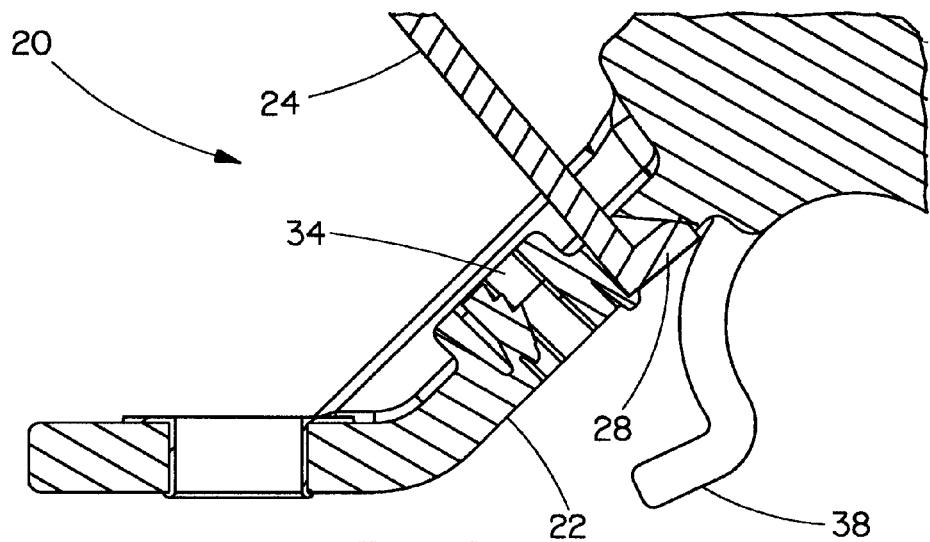
FIG. 9 is a cross-sectional view taken along lines 9-9 of FIG. 8.

As best seen in FIG. 6, cable strap 24 includes a retention tab 28, which fits within retention tab pocket 30 of cable bracket 22. Cable strap 24 also includes teeth 32 for engaging cable strap wedge 34 on cable bracket 22, as best seen in FIG. 13. Cable strap 24 may be pre-installed into cable bracket 22, as best seen in FIGS. 4 and 5. As shown in FIGS. 4 and 5, strap retention barb 36 retains cable strap 24 in retention tab pocket 30.

Figure 1:
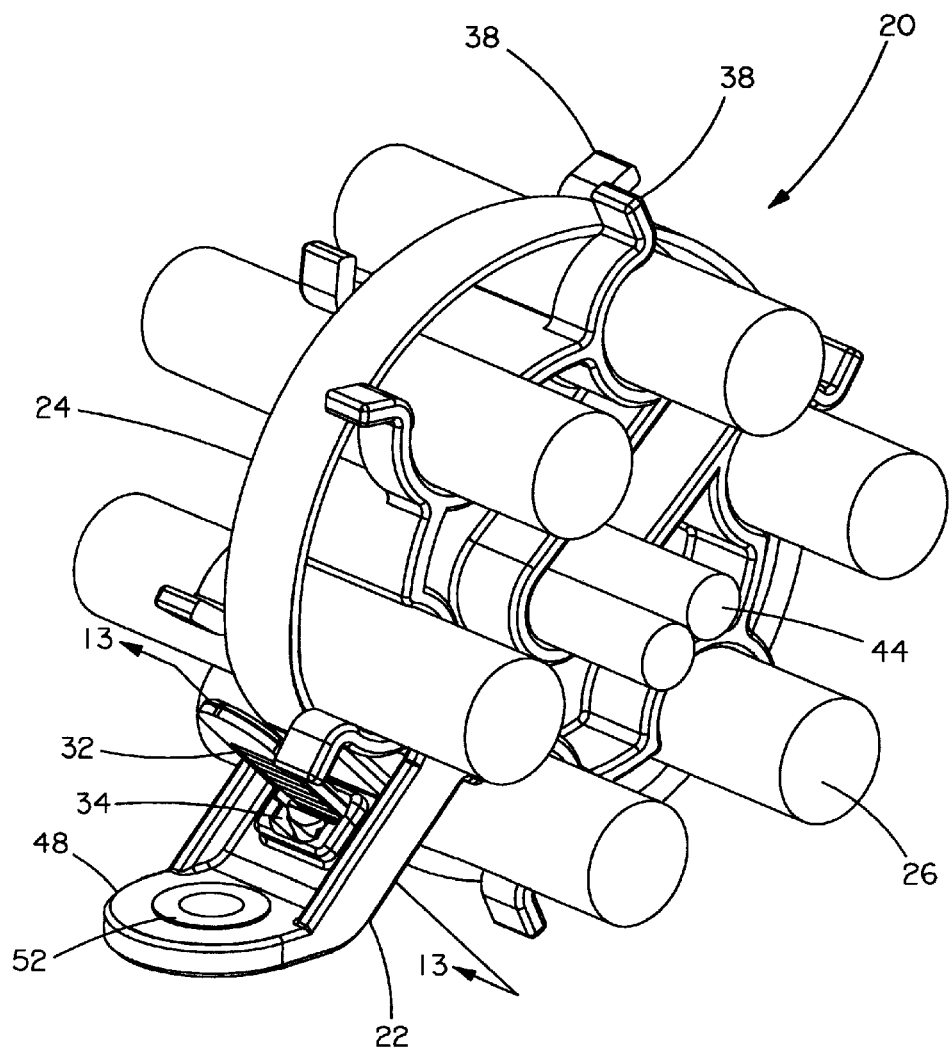
FIG. 1 is a front top perspective view of a cable bracket and strap assembly according to a first embodiment of the present invention.
Figure 2:
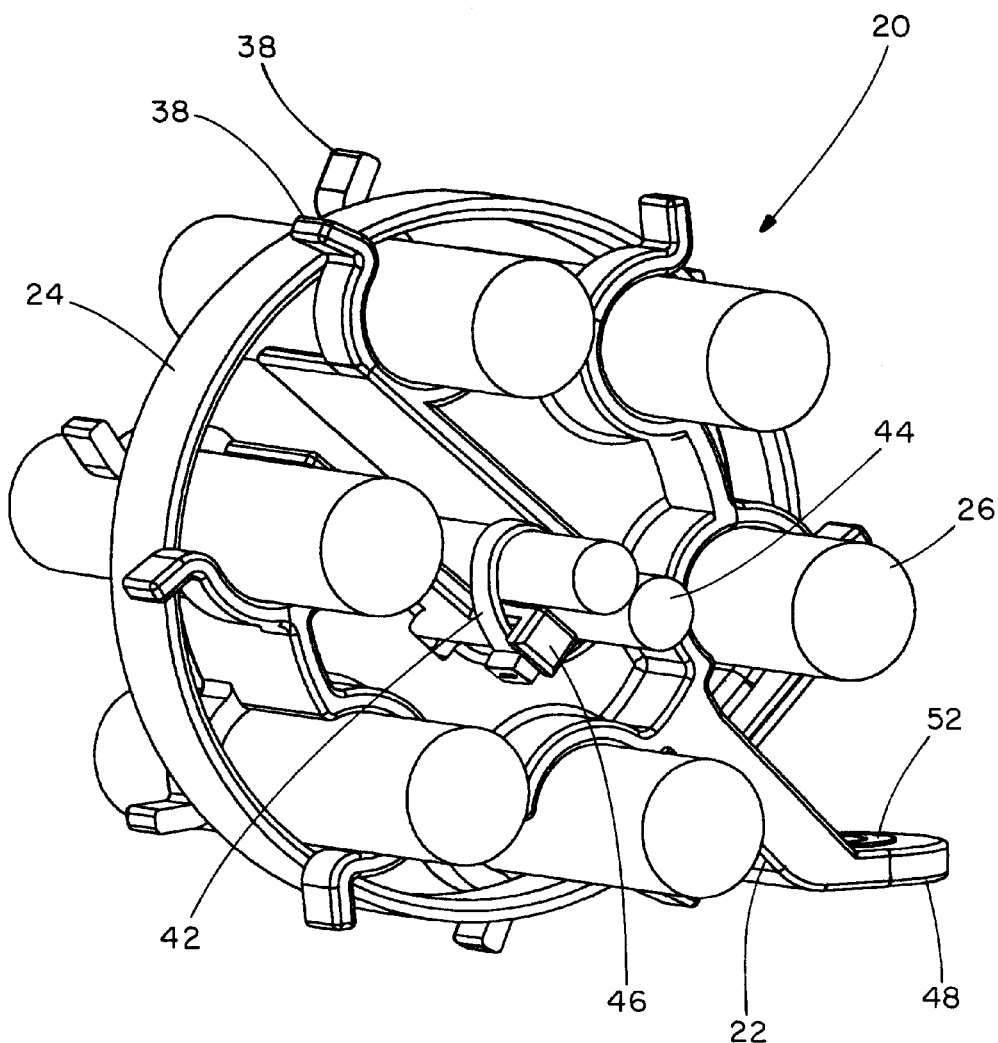
FIG. 2 is a rear top perspective view of the assembly of FIG. 1.
Figure 3:
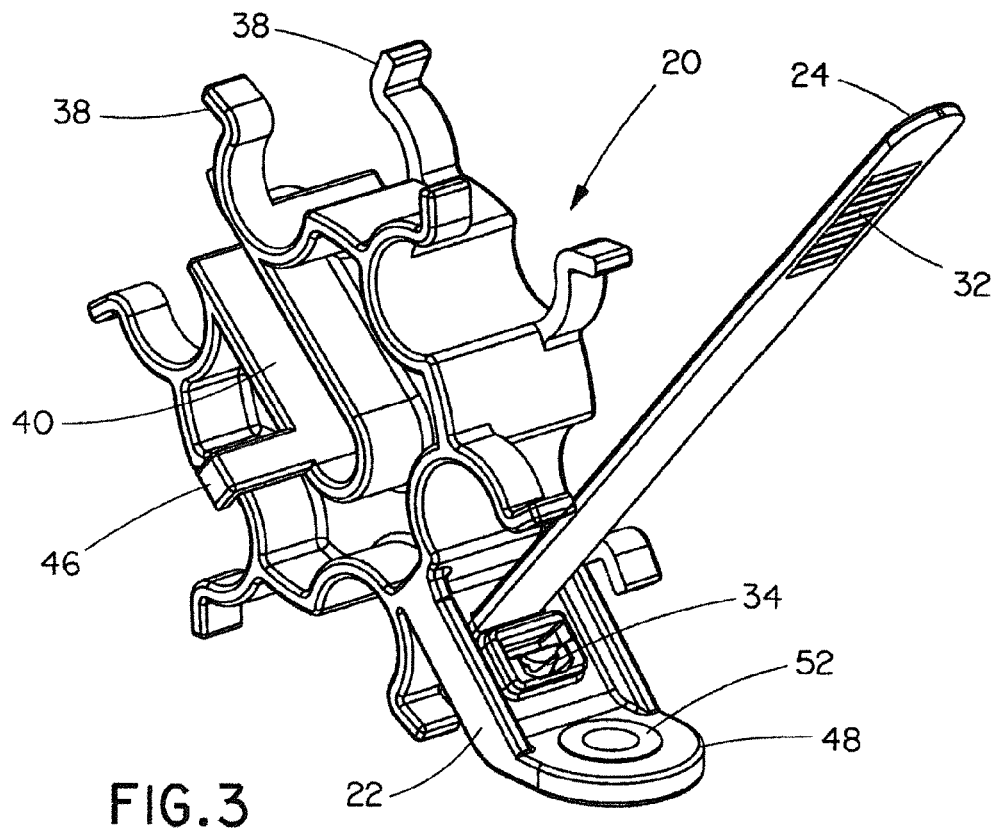
FIG. 3 is a rear top perspective view of the assembly of FIG. 1, with the power conductors and signal wires removed.
Figure 10:
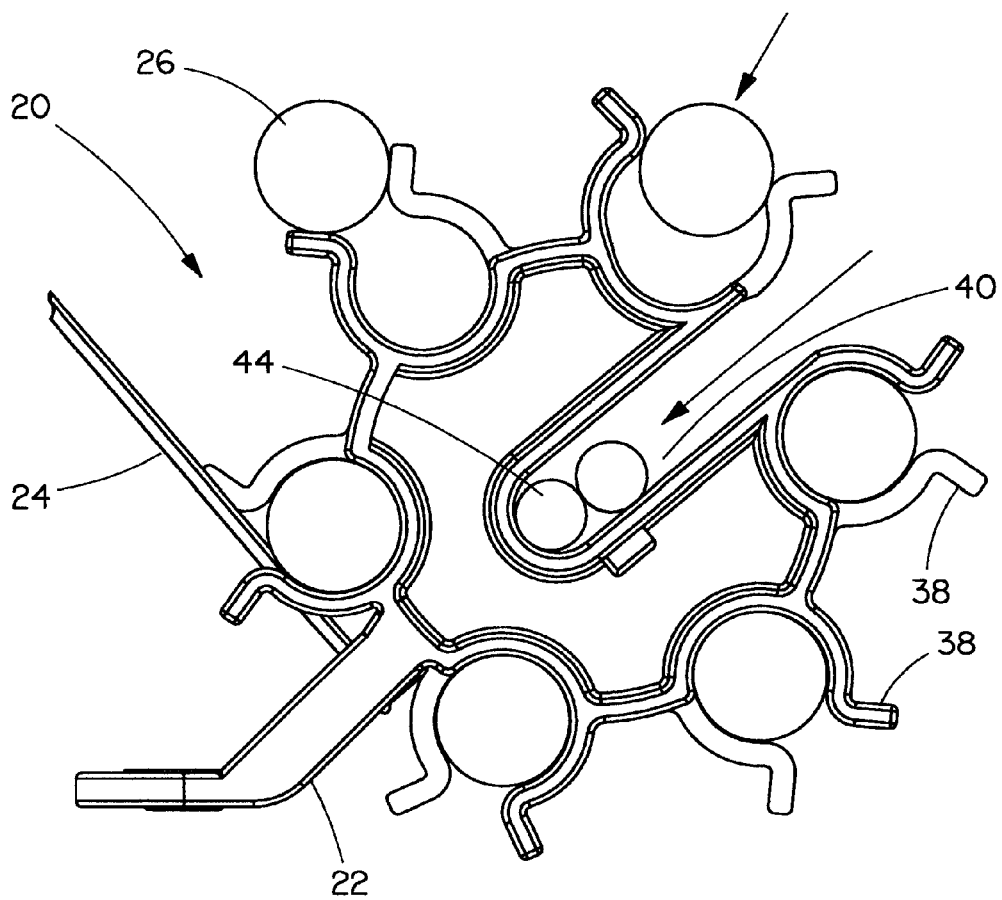
FIG. 10 is a front view of the assembly of FIG. 4, with the power conductors and signal wires being inserted into the cable bracket.
Figure 11:
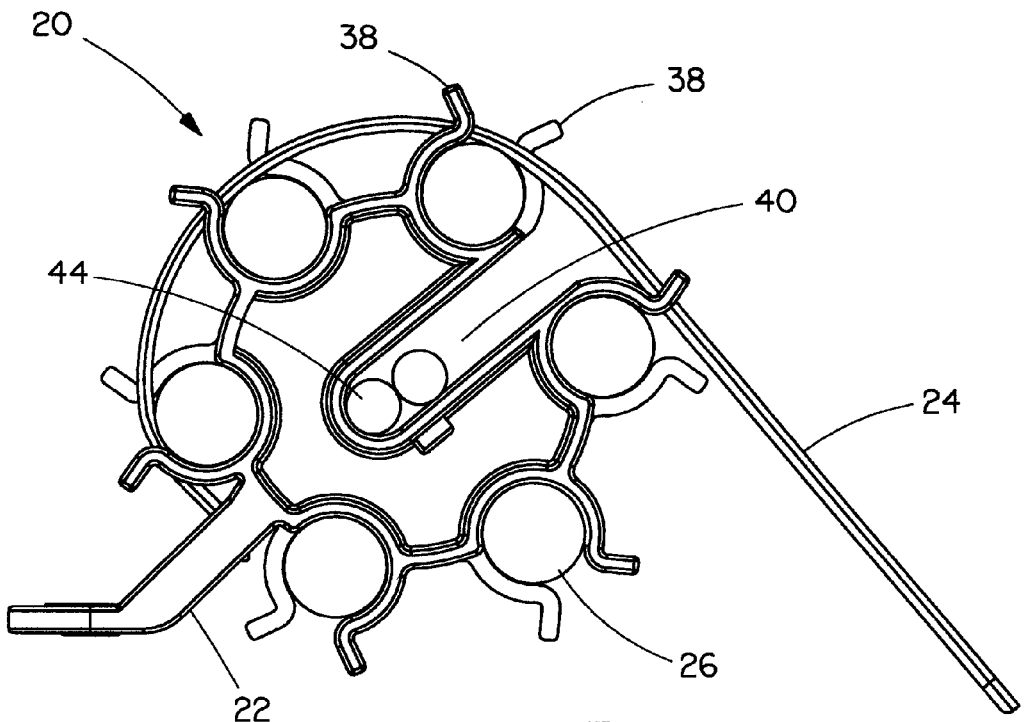
FIG. 11 is a front view of the assembly similar to FIG. 10, with the cable strap positioned around some of the power conductors.
Figure 12:
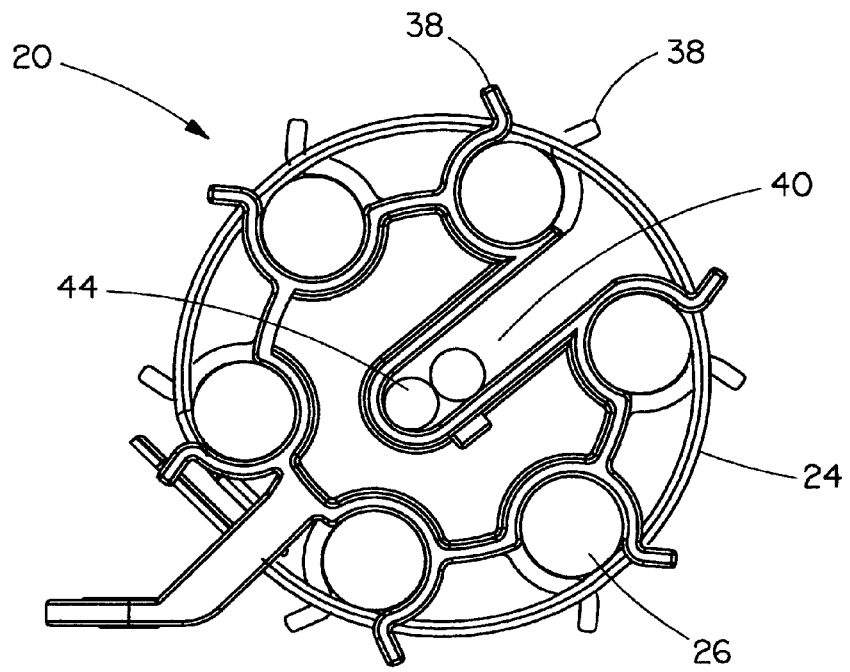
FIG. 12 is a front view of the assembly similar to FIG. 10, with the cable strap positioned around the power conductors and inserted through the cable strap wedge.

As shown in FIGS. 1-4, cable bracket 22 includes a plurality of strap retention clips, such as retention clip 38. Retention clips 38 temporarily retain power conductors 26 within cable bracket 22 until cable strap 24 is fastened therearound, as shown in FIGS. 10-12. Also, retention clips 38 prevent side-to-side movement of cable strap 24, as best seen in FIGS. 1 and 2.

As shown in FIGS. 10-12, cable bracket 22 includes signal wire recess 40 within the center of cable bracket 22. Preferably, recess 40 is a U-shaped slot. However, as shown in FIGS. 14-16, the signal wire recess may be various shapes and sizes. Cable tie 42 may be used to secure signal wires 44 within recess 40. As best seen in FIG. 2, cable tie 42 is positioned around wires 44 and cable tie retention post 46 to secure wires 44 therein.

As shown in FIGS. 1-6, cable bracket 22 includes a mounting flange 48 for mounting assembly 20 to the frame of an aircraft. Mounting flange 48 includes an aperture 50, and a metal grommet 52 may be inserted into aperture 50 to provide additional strength to mounting flange 48.

FIGS. 14-16 illustrate cable bracket and strap assembly 120. Assembly 120 is similar to cable bracket and strap assembly 20 shown in FIGS. 1-13, except for the configuration of signal wire recess 40. As best seen in FIGS. 10-12, recess 40 is configured as a U-shaped slot. Alternatively, as best seen in FIG. 16, assembly 120 includes signal wire recess 140 configured as an angled slot. Cable bracket and strap assembly 120 is identical to, and functions similarly as, assembly 20 in all other respects.

In operation, signal wires 44 are placed into signal wire recess 40 and are retained therein preferably with cable tie 42, as best seen in FIG. 2. As shown in FIG. 2, cable tie 42 is secured around cable tie retention post 46. Power conductors 26 are installed into cable bracket 22 and temporarily retained therein by strap retention clips 38, as shown in FIG. 10. Cable strap 24 is then pulled around power conductors 26, as shown in FIG. 11, and routed through cable strap wedge 34, as shown in FIG. 12. As best seen in FIG. 13, teeth 32 are external to, or facing away from, power conductors 26 after cable strap 24 is secured around cable bracket 22. Cable strap wedge 34 engages teeth 32, and cable strap 24 is tensioned using a cable tie tensioning device (not shown).

The cable bracket and strap assembly provides uniform pressure to, and tightly retains, a wide range of power conductor diameters and therefore assists in preventing axial movement of the power conductors. It should be noted that the above-described illustrated embodiments and preferred embodiments of the invention are not an exhaustive listing of the form such a cable bracket and strap assembly in accordance with the invention might take; rather, they serve as exemplary and illustrative of embodiments of the invention as presently understood.

The invention claimed is:

1. A cable bracket and strap assembly comprising:
a cable bracket having an outer surface, wherein the outer surface of the cable bracket having a plurality of retention elements defining a plurality of conductor openings, a wire recess positioned between two retention elements, the wire recess extending from the outer surface to a center of the cable bracket and a mounting flange, wherein the mounting flange includes a first aperture and a second aperture; and
a strap secured to the cable bracket within the first aperture.

2. The assembly of claim 1, wherein the wire recess includes a retention post.

3. The assembly of claim 1, wherein the wire recess comprises a U-shaped slot.

4. The assembly of claim 1, wherein the wire recess comprises an angled slot.

5. The assembly of claim 1, wherein the wire recess having a first open end at the outer surface and a second closed end at the center of the cable bracket.

6. The assembly of claim 1, wherein the strap has a retention tab, wherein the retention tab of the strap is secured to the cable bracket within the first aperture.

7. The assembly of claim 1, wherein the mounting flange includes a strap retention barb positioned adjacent the first aperture, the strap retention barb retains the strap within the first aperture.

8. The assembly of claim 1, wherein the second aperture includes a wedge positioned therein, the wedge engages teeth on the strap when the strap passes through the second aperture.

* * * * *